United States Patent
Carlson et al.

(10) Patent No.: US 11,358,330 B2
(45) Date of Patent: Jun. 14, 2022

(54) FILAMENT DEPOSITION HEAD AND METHOD OF DEPOSITING FILAMENT MATERIAL FOR JOINING WORKPIECES

(71) Applicant: GM GLOBAL TECHNOLOGY OPERATIONS LLC, Detroit, MI (US)

(72) Inventors: Blair E. Carlson, Ann Arbor, MI (US); Ryan Gergely, Fraser, MI (US); David A. Okonski, Waterford, MI (US); William R. Rodgers, Bloomfield Township, MI (US); James W. Wells, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 292 days.

(21) Appl. No.: 16/355,062

(22) Filed: Mar. 15, 2019

(65) Prior Publication Data

US 2020/0290271 A1     Sep. 17, 2020

(51) Int. Cl.
*B29C 64/209*     (2017.01)
*B29C 64/118*     (2017.01)
*B29C 64/295*     (2017.01)
*B29C 64/336*     (2017.01)
B29L 31/30     (2006.01)
B33Y 10/00     (2015.01)
B33Y 30/00     (2015.01)

(52) U.S. Cl.
CPC .......... *B29C 64/209* (2017.08); *B29C 64/118* (2017.08); *B29C 64/295* (2017.08); *B29C 64/336* (2017.08); *B29L 2031/3017* (2013.01); *B33Y 10/00* (2014.12); *B33Y 30/00* (2014.12)

(58) Field of Classification Search
CPC ... B29C 64/118; B29C 64/209; B29C 64/218; B29C 64/336
See application file for complete search history.

(56) References Cited

U.S. PATENT DOCUMENTS

| | | | | |
|---|---|---|---|---|
| 5,936,861 | A | * | 8/1999 | Jang ................. B33Y 70/00 700/98 |
| 9,895,844 | B2 | * | 2/2018 | Haider ................ B29C 64/118 |
| 2017/0203506 | A1 | | 7/2017 | Hjelsand et al. |
| 2018/0022027 | A1 | | 1/2018 | Powell |
| 2018/0117851 | A1 | * | 5/2018 | Reese ................ B29C 64/118 |
| 2019/0009472 | A1 | * | 1/2019 | Mark .................. B33Y 10/00 |
| 2020/0139624 | A1 | * | 5/2020 | Khondoker .......... B29C 64/205 |

FOREIGN PATENT DOCUMENTS

CN     206825940 U     1/2018

* cited by examiner

*Primary Examiner* — Joseph S Del Sole
*Assistant Examiner* — Manley L Cummins, IV
(74) *Attorney, Agent, or Firm* — Vivacqua Crane, PLC (57) ABSTRACT

A fused filament deposition head is employed for depositing filament materials on workpieces to join the workpieces together. The workpieces can be of an automotive application, aerospace application, or something else. The fused filament deposition head, in an example, has a feed end, a dispensing end, and a heater. The feed end introduces more than one filament in the fused filament deposition head, as demanded in the larger application. The dispensing end delivers materials of the filaments to the underlying workpieces. The materials are delivered together. The heater serves to heat the filaments as they travel through the fused filament deposition head. The filaments can include a filament having a core portion of liquid-crystal polymer material.

4 Claims, 5 Drawing Sheets

FILAMENT DEPOSITION HEAD AND METHOD OF DEPOSITING FILAMENT MATERIAL FOR JOINING WORKPIECES

INTRODUCTION

The present disclosure relates generally to additive manufacturing technologies and, more particularly, relates to a deposition head employed in additive joining technologies and a method of depositing filament material for joining workpieces together.

Additive joining is a derivative process of additive manufacturing. The technology can be employed to join together parts in various applications. In an example, a single filament is supplied from a spool and is urged through an extruder head to an underlying part. Along the way the filament is heated and fully melted before exiting the extruder head and before making its way to the part. To date, the applications involving additive manufacturing have been limited to somewhat smaller scale applications, and have not been readily suited for larger scale applications such as those found in mass production environments due to the amount of filament material demanded and the rate in which the material is needed in the larger applications, among other reasons. The automotive industry, for instance, joins together workpieces on a large scale and in an automated and mass production manner. One example is the manufacture of truck beds. Truck beds, moreover, are increasingly incorporating lighter weight materials—such as polymer composites like carbon fiber composites—as workpieces in their manufacture. Joining together composite workpieces, whether in an automotive or aerospace or some other application, presents certain challenges. Adhesive bonding and riveting are among the current approaches for joining the composite workpieces together.

SUMMARY

In an embodiment, a fused filament deposition head may include a feed end, a dispensing end, and one or more heaters. The feed end introduces multiple filaments in the fused filament deposition head. The dispensing end is situated downstream of the feed end. The dispensing end delivers materials of the multiple filaments together upon exit of the multiple filaments from the dispensing end. The heater(s) are situated between the feed end and the dispensing end. The heater(s) heat the multiple filaments as the filaments travels from the feed end and to the dispensing end.

In an embodiment, a volume of the delivered material of the multiple filaments over an extent is greater than a volume of a single filament of the multiple filaments over the same extent.

In an embodiment, the fused filament deposition head may include a single nozzle. The feed end concurrently introduces the multiple filaments into the single nozzle.

In an embodiment, the delivered material of the multiple filaments includes a portion or more of each of the multiple filaments being in a molten state when they exit from the single nozzle.

In an embodiment, the multiple filaments are introduced into the single nozzle as discrete filaments. The multiple filaments subsequently exit the single nozzle as a conglomerated filament composed of the multiple filaments.

In an embodiment, the fused filament deposition head may further include multiple nozzles. The feed end introduces a single filament of the multiple filaments into a single nozzle of the multiple nozzles.

In an embodiment, the single filaments of the multiple filaments come together for delivery to a workpiece when the single filaments exit their respective single nozzles of the multiple nozzles.

In an embodiment, the materials of the multiple filaments come together at a location that is upstream of the dispensing end.

In an embodiment, the materials of the multiple filaments come together at a location that is downstream of an exit of the dispensing end.

In an embodiment, one or more of the multiple filaments includes a shell portion and a core portion. The shell portion is composed of a first material, and the core portion is composed of a second material. The second material is a liquid-crystal polymer material.

In an embodiment, the fused filament deposition head may include a slot identifier. The slot identifier is carried near the dispensing end. The slot identifier serves to locate slots of a workpiece. Once located, the materials of the multiple filaments can be delivered in the slots when the materials of the multiple filaments exit from the dispensing end.

In an embodiment, the fused filament deposition head may include a preheater. The preheater is carried near the dispensing end. The preheater serves to heat a workpiece before the delivery of the materials of the multiple filaments on the workpiece.

In an embodiment, the fused filament deposition head may include a finisher. The finisher comes into abutment with the materials of the multiple filaments once the materials exit from the dispensing end and are delivered to a workpiece.

In an embodiment, the finisher is a consolidation shoe, or the finisher is a consolidation roller.

In an embodiment, the fused filament deposition head may include a severing tool. The severing tool is carried near the dispensing end. The severing tool serves to cut the materials of the multiple filaments as the materials exit from the dispensing end.

In an embodiment, a method of depositing filament material of multiple filaments on workpieces for joining the workpieces may involve several steps. In one step, the multiple filaments are fed to a fused filament deposition head. Another step includes heating the multiple filaments as the multiple filaments travel through the fused filament deposition head. Yet another step includes dispensing materials of the multiple filaments on the workpieces. The materials of the multiple filaments being adjoined together upon being dispensed. A portion or more of each of the multiple filaments are in a molten state upon being dispensed in this step.

In an embodiment, the method may further involve the step of locating slots of one or more of the workpieces and dispensing the materials of the multiple filaments into the located slots for the purpose of ultimately joining the workpieces. The slots are located prior to the materials of the multiple filaments being dispensed therein.

In an embodiment, the method may further involve the step of preheating the workpieces at a site thereof that receives the dispensed materials of the multiple filaments. The preheating occurs prior to the materials of the multiple filaments being dispensed to the site.

In an embodiment, the method may further involve the step of finishing the dispensed materials of the multiple filaments. The finishing occurs after the materials of the multiple filaments are dispensed on the workpieces. The finishing involves abutment with the dispensed materials of the multiple filaments at the workpiece.

In an embodiment, a fused filament deposition head may include a feeder, one or more heaters, and one or more nozzles. The feeder introduces multiple filaments in the fused filament deposition head. The multiple filaments are fed from multiple supply sources. A single supply source of the multiple supply sources furnishes a single filament of the multiple filaments. The heater(s) heats the multiple filaments as the multiple filaments travel through the fused filament deposition head. The nozzle(s) receives the heated multiple filaments. The nozzle(s) delivers materials of the multiple filaments together upon exit of the multiple filaments from the nozzle(s).

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

Embodiments of a fused filament deposition head 10 and a method of depositing filament material are presented in the figures and described below. The fused filament deposition head 10 and the method lend themselves for use in large scale and mass production and automated environments—such as those customary in the automotive industry—more so than past approaches. The amount of filament material demanded and the rate at which it is demanded in the larger scale environments exceeds the capabilities of known extruder heads. In an automotive application, the fused filament deposition head 10 and the method can serve to join workpieces of polymer composite materials like carbon fiber composites, and hence can supplant past approaches that use adhesive bonding and riveting for such composite workpieces. A robust joint between composite workpieces can be effected according to the disclosures herein. And while the fused filament deposition head 10 and the method are described in the context of automotive workpieces, skilled artisans will appreciate that the head 10 and method are not so limited and can be employed in other contexts such as aerospace, energy, infrastructure, and consumer goods applications, among many others.

Figure 1:
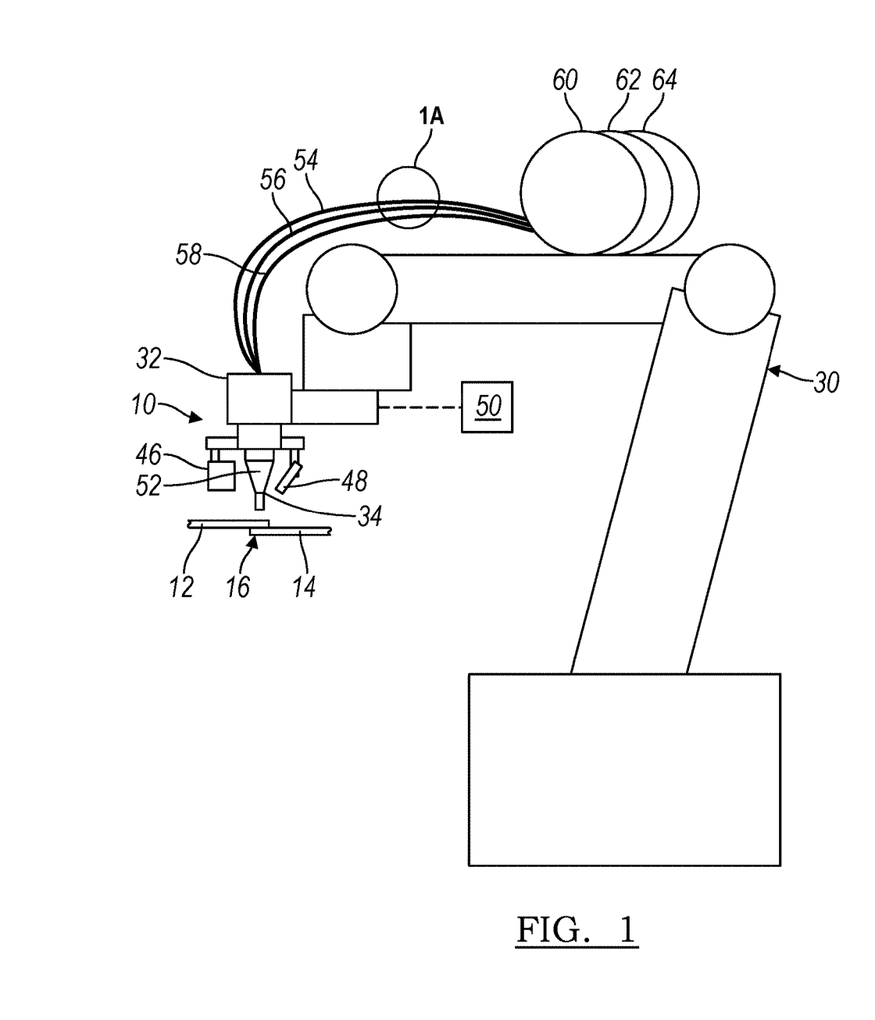
FIG. 1 is a schematic depiction of an embodiment of a filament deposition robot.

With reference now to FIG. 1, a first workpiece 12 and a second workpiece 14 can be joined together via the fused filament deposition head 10 and the method of depositing filament material. The first workpiece 12 may be a workpiece employed in the manufacture of an automotive component or structure, such as a truck bed. The first workpiece 12 can be a polymer composite workpiece that is composed of different polymer composite materials made of a polymer matrix and a reinforcement bound by the polymer matrix. In an example, the first workpiece 12 is a carbon fiber composite workpiece of a Nylon 6 plastic with 45 percent (%) by weight of carbon fiber or 35% by volume of carbon fiber. In other examples, the first workpiece 12 can be an injection-molded glass-nylon workpiece, a compression-molded recycled carbon fiber, or the like. Still, the first workpiece 12 could be composed of many other materials including non-polymer-composite materials. Like the first workpiece 12, the second workpiece 14 may be a workpiece employed in the manufacture of an automotive component or structure, such as a truck bed. The second workpiece 14 can be a polymer composite workpiece that is composed of different polymer composite materials made of a polymer matrix and a reinforcement bound by the polymer matrix. In an example, the second workpiece 14 is a carbon fiber composite workpiece of a Nylon 6 plastic with 45 percent (%) by weight of carbon fiber or 35% by volume of carbon fiber. In other examples, the second workpiece 14 can be an injection-molded glass-nylon workpiece, a compression-molded recycled carbon fiber, or the like. Still, the second workpiece 14 could be composed of many other materials including non-polymer-composite materials. In an embodiment, the first and second workpieces 12, 14 do not necessarily have to be composed of the same materials. Together, the first and second workpieces 12, 14 make up a workpiece stack-up 16. Still, in other embodiments not depicted in the figures, and depending on the application, the workpiece stack-up 16 could include more than two workpieces such as three workpieces or four workpieces.

Figure 8:
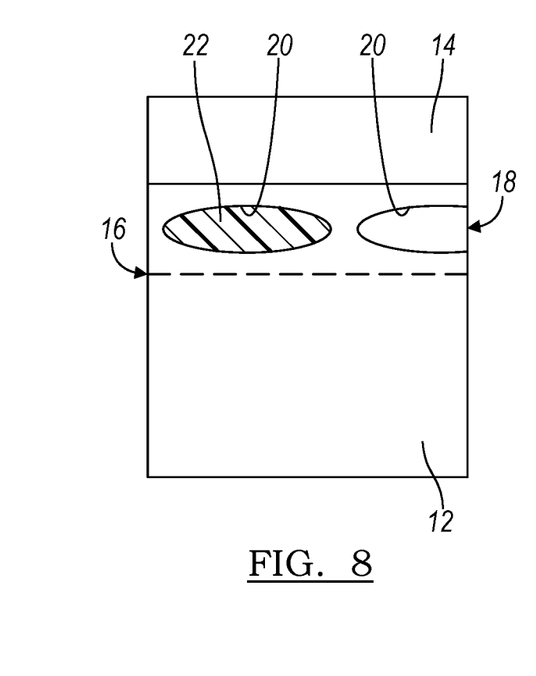
FIG. 8 is a top view of a joint between workpieces formed by the fused filament deposition head embodiments.
Figure 9:
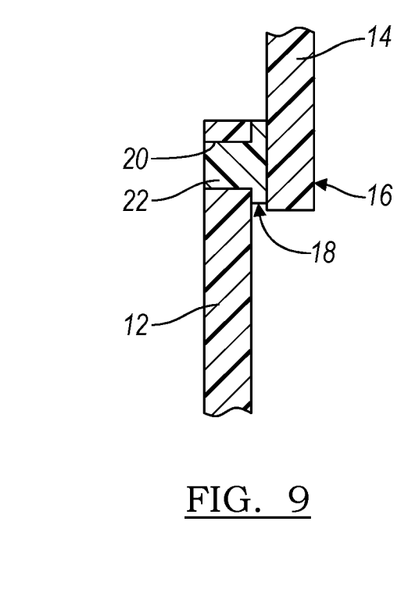
FIG. 9 is a sectional view of the joint.

A joint produced between the first and second workpieces 12, 14 via the fused filament deposition head 10 and the method can take various forms. Turning now to FIGS. 8 and 9, in this example the joint is a stitch joint 18. The stitch joint 18 is made by a series of slots 20 residing near and along an edge of the first workpiece 12 that are filled by filament material 22 deposited from the fused filament deposition head 10, as subsequently described. The slots 20 can be pre-formed in the first workpiece 12 or fabricated therein. The filament material 22, partially or more molten at the time of being deposited, hardens in place in the slots 20 and in contact with the underlying second workpiece 14, establishing the stitch joint 18 therebetween. The filament material 22 can harden against interior surfaces of the slots 20 and against a confronting upper surface of the underlying second workpiece 14. Furthermore, the workpiece stack-up 16 in FIG. 9 depicts the first and second workpieces 12, 14 separated by a gap filled with filament material 22; but in other embodiments the first and second workpieces 12, 14 need not be separated by the gap and instead the workpieces 12, 14 can make surface-to-surface abutment with each other and with the filament material 22 present only in the slots 20. Still, many other types of joints can be produced among workpieces by way of the fused filament deposition head 10 and the method of depositing filament material, such as those involving a single slot and slots of different shapes and patterns.

The filament material 22 deposited by the fused filament deposition head 10 can have various compositions and various configurations prior to its deposition. The precise composition and configuration of the filament supplied to the fused filament deposition head 10 is oftentimes dictated by the composition of the workpieces with which the filament will be employed for joint formation. In the example workpiece compositions presented above, for instance, the filament too can be composed partly or more of a polymer composite material. In an example, the filament has a homogeneous body composed wholly of a thermoplastic material such as Nylon 6 plastic. In another example, and referring now to FIG. 1A, a filament 24 has a shell portion 26 at its exterior and a core portion 28 at its interior encased by the shell portion 26. The shell and core portions 26, 28 can be composed of different materials relative to each other, with the shell portion 26 of a material exhibiting perhaps greater compatibility with the material of the associated workpieces. For thermoplastic polymers as the shell portion 26 and as the first and second workpieces 12, 14, for example, the thermoplastic polymers are compatible if they have the same polymer composition such as if the thermoplastic polymers are both polycaprolactam (polyamide 6, PA 6, or Nylon 6), since polymers of the same composition can simply intermix without causing any changes in chemistry or properties. Thermoplastic polymers are also considered compatible if the polymers have different polymer compositions but are nonetheless miscible in that the polymers, when mixed, form a single-phase blend that exhibits one glass transition temperature. An example of compatible thermoplastic polymers that have different polymer compositions is polybutylene terephthalate (PBT) and polyethylene terephthalate (PET).

Figure 1A:
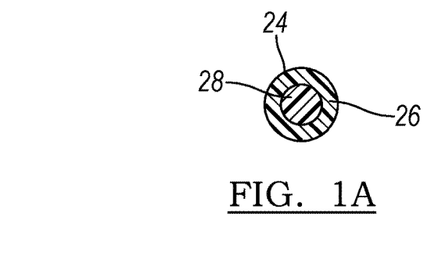
FIG. 1A is a sectional view of an embodiment of a filament that can be used with the filament deposition robot.

Furthermore, the shell portion 26, for example, can be composed of a thermoplastic material such as Nylon 6 plastic, and the core portion 28 can be composed of a liquid-crystal polymer. In yet other examples, the filament can be composed of polymer composite materials made of a polymer matrix and a reinforcement bound by the polymer matrix. The polymer matrix can be Nylon 6 and the reinforcement can be carbon fiber, glass-based, or mineral-based filler materials. In yet additional examples, the shell portion 26 can be composed of the following: polyvinyl chloride, polyvinylidene chloride, polyvinyl acetate, polyvinyl alcohol, polystyrene, acrylonitrile-styrene polymer, acrylonitrile-butadiene-styrene resin, polyacrylate resin, polymethacrylate, polyethylene, polypropylene, polyamide (PA46, PA6, PA66, PA11, PA12, PA610), fully or partially aromatic polyamide resins, polyacetal resin, polybenzimidazole, polycarbonate, polyethylene terephthalate, polyethylene naphthalate, polyethylene terephthalate, polybutylene terephthalate, polyphenyl ethers, polyphenylene oxides, polyphenylene sulfide, polyethersulfones, polyetherether ketones, polyether ketones, polyetherimides, polylactides, polyoxymethylenes, thermoplastic polyurethanes, or any combination or copolymer of these resins. And in yet additional examples, the core portion 28 can be a polymer mixture composed of the following: carbon fibers, glass fibers (e.g., fiber glass, quartz), basalt fibers, para-aramid fibers (e.g., KEVLAR®, polyphenylene benzobisoxazole (PBO)) polyethylene fibers (e.g., high-strength ultra-high molecular weight (UHMW) polyethylene), polypropylene fibers (e.g., high-strength polypropylene), thermotropic liquid crystal polymers, natural fibers (e.g., cotton, flax, cellulose, spider silk), and combinations thereof, by way of non-limiting example. Additionally, the polymer mixture of the core portion 28 can have reinforcing materials of glass particulates, spheres, or flakes, or mineral fillers such as talc, wollastonite, calcium carbonate, mica, aluminosilicate clays, or halloysites, either used individually or in combination. Furthermore, when the filament is provided in wire form, the filament can have a diameter ranging approximately between 1.0 millimeters (mm) and 10.0 mm. Still, many other compositions of the filament are possible, as well as many other configurations with other diameter values.

When the filament is provided as feedstock in wire form—and due to the nature of the composition of the filament material in certain embodiments—it has been found that the winding of the filament wire for its supply has certain restrictions. As the diameter of the filament wire grows in size, a minimum bend radius of the filament wire may also grow. This restrains the size of the filament wire that can be effectively wound and supplied in a production environment, which in turn restrains the amount of filament material available from a single filament wire in the larger scale environments. The fused filament deposition head 10 and the method of depositing filament material were hence designed and constructed to resolve these shortcomings, and to ultimately satisfy the amount and rate of filament material demanded in the larger scale and mass production and automated environments. The fused filament deposition head 10 can have various designs and constructions in different embodiments depending upon the particular application in which the fused filament deposition head 10 will be utilized and the amount and rate of filament material called for in application, among other possible factors. Indeed, the fused filament deposition head 10 can have more, less, and/or different components than those described herein and depicted in the figures.

Figure 2:
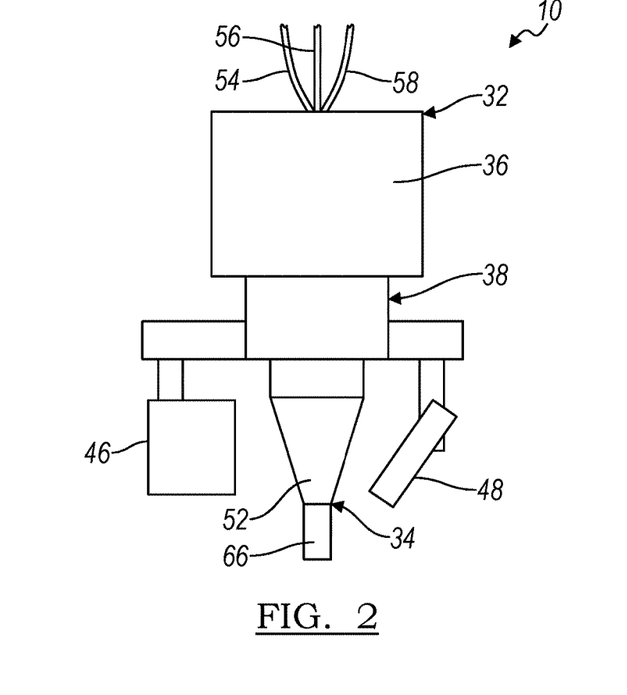
FIG. 2 is a schematic depiction of an embodiment of a fused filament deposition head.

In the embodiment presented by the figures, and turning now to FIGS. 1 and 2, the fused filament deposition head 10 is equipped on a filament deposition robot 30. The filament deposition robot 30 readies the fused filament deposition head 10 for movements and other furnishings of mass production and automation applications. In this embodiment, the fused filament deposition head 10 has a feed end 32 and a dispensing end 34 residing downstream of the feed end 32 (the terms downstream and upstream are used herein with reference to the direction of travel of the filaments through the fused filament deposition head 10). The feed end 32, also referred to as a cold end, serves to receive the filaments prior to processing of the filaments via the fused filament deposition head 10. In one example, the feed end 32 includes a feeder 36 in the form of a pair of rollers that works to pull the filaments from their supply sources and introduce the filaments into the fused filament deposition head 10. Still, other types of feeders and other techniques for introducing the filaments are possible. The rate at which the filaments are fed at the feed end 32 can be controlled by a stepper motor or some other means. The dispensing end 34, also referred to as a hot end, serves to deliver materials of the filaments when the materials exit the fused filament deposition head 10.

Figure 4:
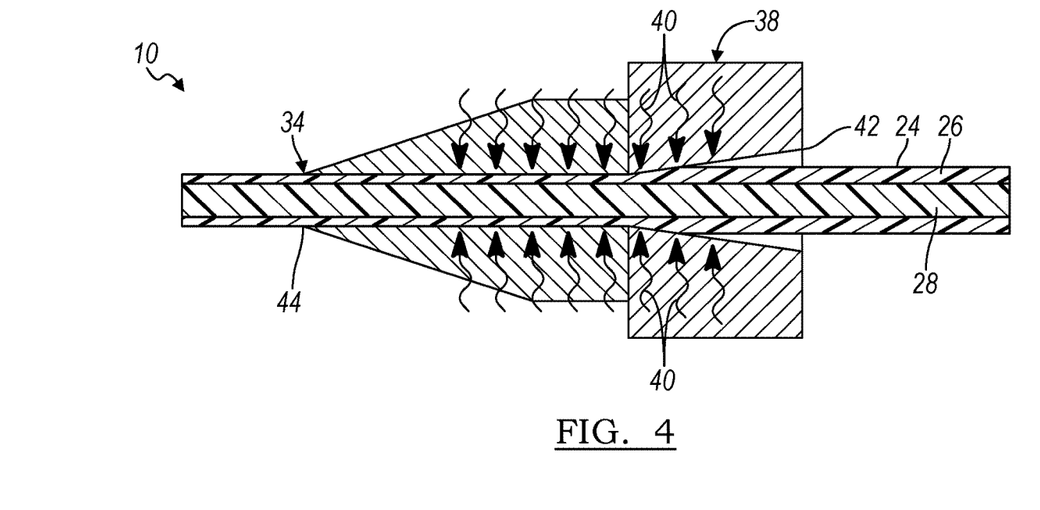
FIG. 4 is a sectional view of the fused filament deposition head.

One or more heaters 38 are situated between the feed end 32 and the dispensing end 34. The heater(s) 38 serves to heat and partially or more melt the filaments as the filaments travel through the fused filament deposition head 10 from the feed end 32 and to the dispensing end 34. In examples, the heater(s) 38 can be in the form of resistive heaters, electric coil heaters, or some other type of heater or some other technique of generating heat in the fused filament deposition head 10. Arrowed lines 40 in FIG. 4 are intended to represent the heat applied to the filament 24 as it travels from an entrance 42 of the heater(s) 38 to an exit 44 at the dispensing end 34 (FIG. 4 shows the single filament 24 for demonstrative purposes). The degree of melting of the filaments brought about by the heater(s) 38 and at the exit 44 will depend on the temperature generated and the composition and configuration of the filaments themselves. In the example of a filament composed wholly of a thermoplastic material, all of the filament may be brought to a fully molten state. In the example of the filament 24 with the shell portion 26 of Nylon 6 plastic and the core portion 28 of liquid-crystal polymer the heater(s) 38 can generate an increased temperature that melts the shell portion 26 and brings the core portion 28 to a partially crystalline, but not fully liquid, state.

Furthermore, in this embodiment, and referring again to FIGS. 1 and 2, the fused filament deposition head 10 is equipped with a slot identifier 46 and a preheater 48. The slot identifier 46 serves to locate the slots 20 of an underlying workpiece before the materials of the filaments are delivered from the dispensing end 34 and into the slots 20. In certain embodiments, the slot identifier 46 may possess the capabilities of determining the approximate size and volume of the slots 20. The materials of the filaments are hence delivered in the proper place and in the proper fill amount according to these embodiments of the slot identifier 46. The slot identifier 46 can be carried near the dispensing end 34, and in the embodiment of FIGS. 1 and 2 can be mounted directly to the fused filament deposition head 10 for ready identification and locating at the dispensing end 34. In examples, the slot identifier 46 can be in the form of a laser scanner, a camera, a probing device, or some other type of identifier or some other technique of slot identification. The preheater 48 serves to pre-heat the first workpiece 12 and/or the second workpiece 14 before the materials of the filaments are delivered from the dispensing end 34 and into the slots 20. This pretreatment may enhance adhesion and bonding between the materials of the filaments and of the workpieces 12, 14. Depending on the embodiment, the preheater 48 can heat, chemically roughen, and/or clean the underlying workpiece. Like the slot identifier 46, the preheater 48 can be carried near the dispensing end 34, and in the embodiment of FIGS. 1 and 2 can be mounted directly to the fused filament deposition head 10 for ready preheating at the dispensing end 34. In examples, the preheater 48 can be in the form of a laser, atmospheric plasma producer, or some other type of preheater or some other technique of pretreatment. Furthermore, one or more controllers 50 can be provided to manage the operations of the slot identifier 46 and preheater 48, as well as to manage other operations of the fluid filament deposition head 10.

Figure 3:
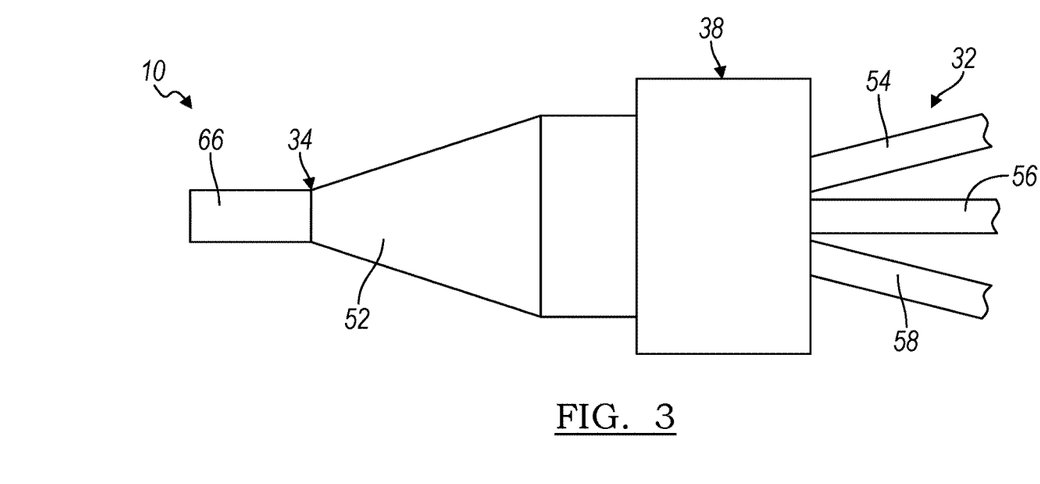
FIG. 3 is an enlarged view of the fused filament deposition head.

Unlike past approaches, the fused filament deposition head 10 furnishes the amount of filament material demanded in the larger scale and mass production and automated environments, and at the rate demanded in the environments. Two embodiments are presented for satisfying these demands. In a first embodiment of FIGS. 1-3, the fused filament deposition head 10 has a single print nozzle 52 at its dispensing end 34 and multiple filaments are introduced and processed through the fused filament deposition head 10 and ultimately exit the single print nozzle 52. The multiple filaments in the embodiment presented include a first filament 54, a second filament 56, and a third filament 58. Still, in other embodiments the multiple filaments can include another quantity such as two filaments or five filaments. The first filament 54 is supplied from a first supply source 60 such as a reel. Likewise, the second filament 56 is supplied from a second supply source 62 such as a reel, and the third filament 58 is supplied from yet a third supply source 64 such as a reel. Prior to introduction and processing, the first and second and third filaments, 54, 56, 58 are discrete filaments from discrete supply sources. The filaments 54, 56, 58 can be composed of the same materials relative to one another, or can be composed of different materials relative to one another. In this embodiment, the multiple filaments 54, 56, 58 are introduced concurrently into the fused filament deposition head 10 and are fed concurrently to the one print nozzle 52. At the heater(s) 38, the filaments 54, 56, 58 come together and are all concurrently heated and are all partially or more melted. The filaments 54, 56, 58 then experience a degree of constriction downstream at the print nozzle 52 that again brings the filaments 54, 56, 58 together.

Figures 5, 6, 7:
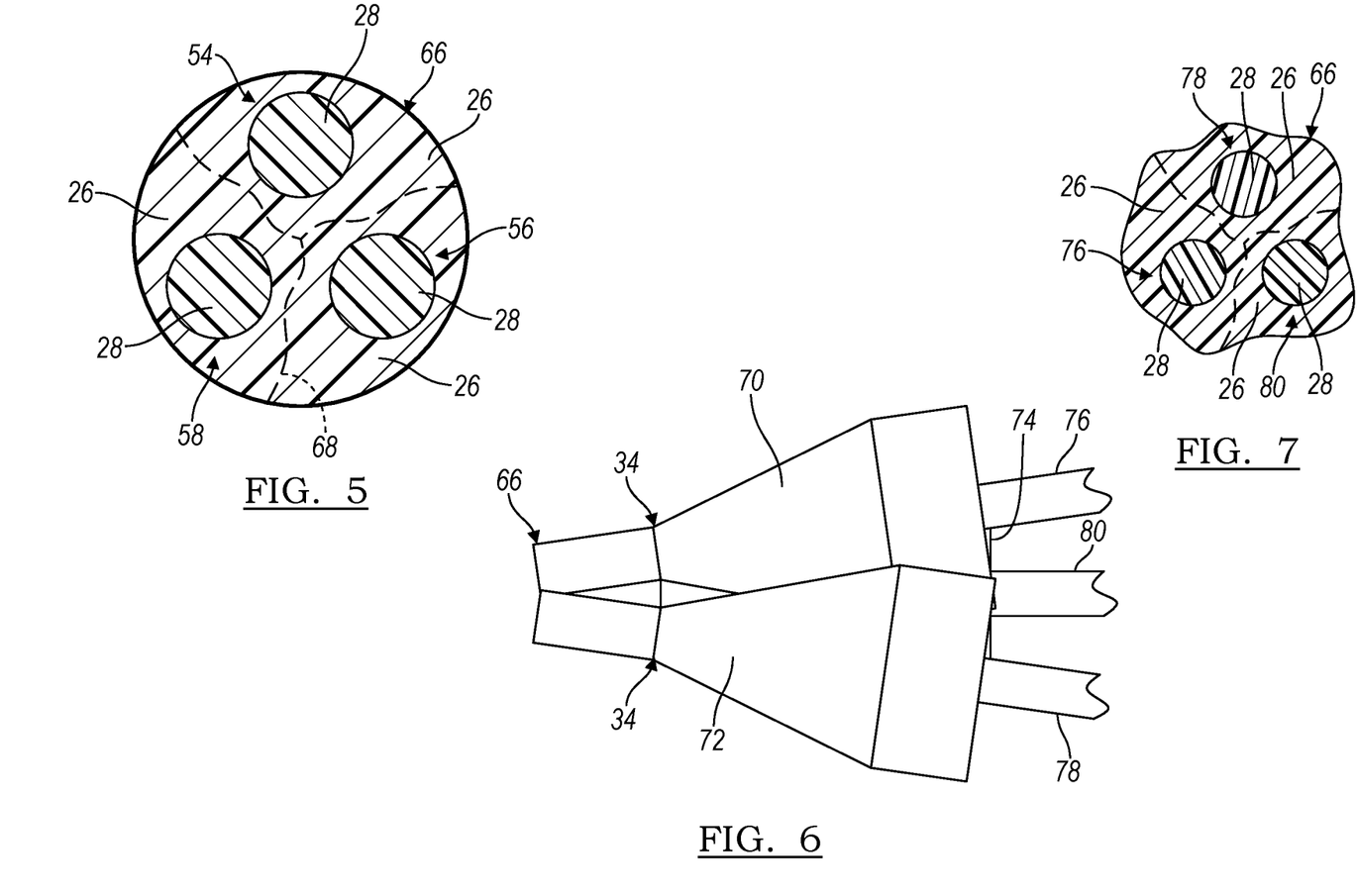
FIG. 5 is a schematic depiction of multiple filaments delivered from the fused filament deposition head.
FIG. 6 is a schematic depiction of another embodiment of a fused filament deposition head.
FIG. 7 is a schematic depiction of multiple filaments delivered from the fused filament deposition head of FIG. 6.

Once processed through the fused filament deposition head 10 and exited from the print nozzle 52, the filaments 54, 56, 58 lack the same discreteness they possessed at introduction. Rather, the filaments 54, 56, 58 take a somewhat conglomerated and singular filament formation 66 upon exit that is then prepared for delivery to the underlying workpiece. The filament formation 66 is composed of all of the first and second and third filaments 54, 56, 58. FIG. 5 depicts an example sectional view of the filament formation 66. In this example, all of the filaments 54, 56, 58 included the shell portion 26 of Nylon 6 and core portion 28 of liquid-crystal polymer. A broken line 68 represents approximate demarcations and seams among the first and second and third filaments 54, 56, 58. In this example, the shell portions 26 have melted and adjoined the filaments 54, 56, 58 together, while the core portions 28 remain largely intact. Moreover, since the single print nozzle 52 receives the multiple filaments 54, 56, 58—instead of a single filament like past approaches—a volume and amount of filament material over a distance and extent of the filament formation 66 is greater than that of a single filament over the same distance and extent. Having separate supply sources means that the filaments 54, 56, 58 as feedstock and in wire form can possess the diameter and size needed to be effectively wound and supplied in a production environment, while still fulfilling the amount and rate of filament material demanded in the production environment.

In a second embodiment of FIGS. 6 and 7, the fused filament deposition head 10 has multiple print nozzles—a first print nozzle 70, a second print nozzle 72, and a third print nozzle 74. In other embodiments lacking depiction, the multiple print nozzles can include another quantity such as two or five print nozzles. Each of the first and second and third print nozzles 70, 72, 74 receive a discrete filament from a discrete supply source. A first filament 76 is fed through the first print nozzle 70, a second filament 78 is fed through the second print nozzle 72, and a third filament 80 is fed through the third print nozzle 74. As before, the filaments 76, 78, 80 can be composed of the same materials or of different materials relative to one another. As depicted in FIG. 6, the first and second and third print nozzles 70, 72, 74 have dispensing ends 34 and exits that are angled toward one another and converge together. In this second embodiment, upstream of the print nozzles 70, 72, 74 a single heater can be used to heat the filaments 76, 78, 80, or multiple heaters can be used. Also, in this embodiment, less than all of the print nozzles 70, 72, 74 can be operational and active at a particular time, permitting differing amounts and rates of filament delivered for a particular slot.

Once processed through the fused filament deposition head 10 and exited from the print nozzles 70, 72, 74, the filaments 76, 78, 80 lack the same discreteness they once possessed. Rather, the filaments 76, 78, 80 take the somewhat conglomerated and singular filament formation 66 upon exit that is then prepared for delivery to the underlying workpiece. The filament formation 66 is composed of all of the first and second and third filaments 76, 78, 80. FIG. 7 depicts an example sectional view of the filament formation 66 resulting from this second embodiment. The filaments 76, 78, 80 merge together and are adjoined downstream of the exits of the print nozzles 70, 72, 74. Furthermore, similar to the first embodiment, here too a greater volume and amount of filament material is provided via the print nozzles 70, 72, 74 in this second embodiment.

Figure 10:
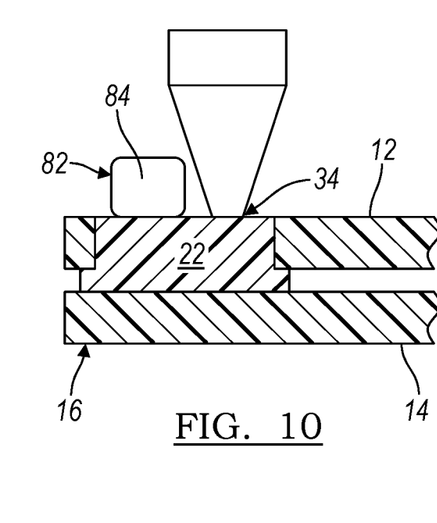
FIG. 10 presents a depiction of a step in an embodiment of a method of use of the fused filament deposition heads.
Figure 11:
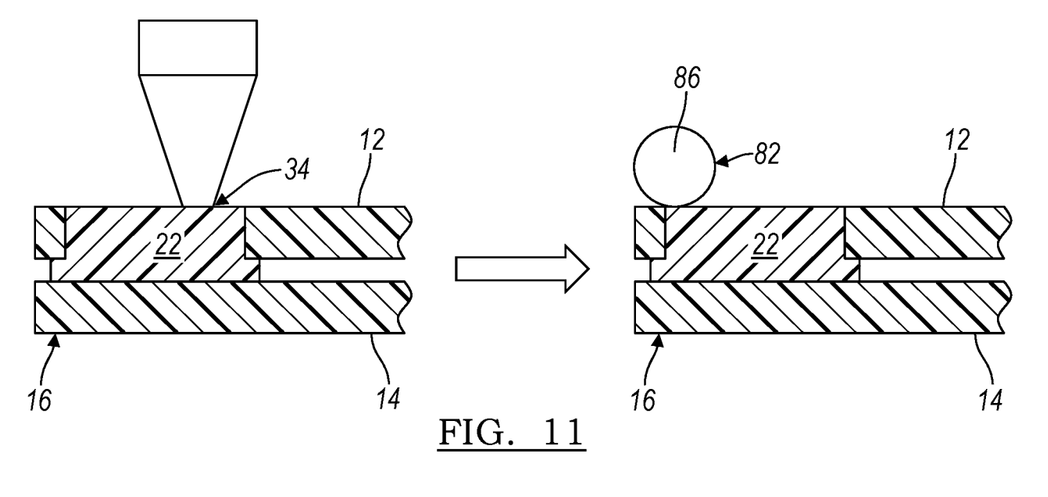
FIG. 11 presents a depiction of steps in an embodiment of a method of use of the fused filament deposition heads.

Referring now to FIGS. 10 and 11, in the embodiments set forth in this description a finisher 82 can be employed to finalize the resulting joint between the first and second workpieces 12, 14. In examples, the finisher 82 can be in the form of a consolidation shoe 84 (FIG. 10), a consolidation roller 86 (FIG. 11), or some other type of finishing equipment like a plate or some other finishing technique. The finisher 82 can perform its functionality simultaneously as the filament material 22 is in the midst of being delivered in the slot 20, or immediately after delivery of the filament material 22 in the slot 20. In FIG. 10, for instance, the consolidation shoe 84 is brought into abutment with an exposed surface of the filament material 22 as soon as the material is filled in the slot 20, or the finisher 82 could be a plate that covers the slot 20 as the filament material 22 is being filled in the slot 20. Conversely, in FIG. 11, the filament material 22 can be delivered in the slot 20 as an initial step (left of the arrow in the figure), and the consolidation roller 86 can be subsequently brought into abutment with the exposed surface of the filament material 22. The consolidation roller 86 can be cooled or heated in order to exert a level of control over hardening and solidification of the filament material 22. Moreover, the consolidation roller 86 can be free to roll or can be driven to roll. In the driven example, the consolidation roller 86 can be driven by a servo motor so that its speed of rotation is consistent with the linear movement speed of the fused filament deposition head 10. In examples, an external surface of the consolidation roller 86 can be textured or otherwise finished complementary to an outer surface of the associated workpiece so that the two surfaces generally resemble each other. In the example of FIG. 10, the finisher 82 can be carried near the dispensing end 34 and/or can be mounted directly to the fused filament deposition head 10. And in the example of FIG. 11, the finisher 82 can be a separate and independent component. The finisher 82 can perform various functions in different embodiments. For example, the finisher 82 can furnish surface finishing such as texturing and/or can exert a downward force to flatten and densify the resulting joint.

Figure 12:
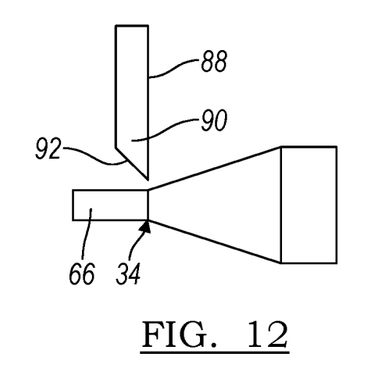
FIG. 12 presents a depiction of a step in an embodiment of a method of use of the fused filament deposition heads.

Lastly, and referring now to FIG. 12, a severing tool 88 can be equipped with the fused filament deposition head 10 in order to cut the filament formation 66 as the filament formation 66 exits the dispensing end 34. The severing tool 88 includes a knife 90 with a blade 92 in the embodiment presented. The severing tool 88 reciprocates upon its actuation and plunges forward and rearward as needed for segmenting the filament formation 66 as the filament formation 66 fills one of the slots 20. Once segmented, filling of the slot 20 is ceased. In other embodiments that lack depiction in the figures, a valve could be employed to cease delivery of the filament formation 66. The valve could be a ball valve that closes the dispensing end 34 upon prompting, or could be a needle valve that closes the dispensing end 34. In the needle valve example, a needle could be situated at an interior of the associated print nozzle. Here, the filaments traveling through the print nozzle can be diverted around the needle, and the needle can be actuated to plug the dispensing end 34.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A fused filament deposition head, comprising:
   a feed end having at least two nozzles extending radially inward to angle toward one another and converge together, the at least two nozzles disposed not parallel to each other, each nozzle capable of introducing a filament comprising a shell portion and core portion encased by the shell portion, the fused filament deposition head arranged to deliver each filament with the core portion intact within the shell portion;
   a dispensing end downstream of the feed end, the dispensing end delivering the filaments from the fused filament deposition head; and
   at least one heater situated between the feed end and the dispensing end, the at least one heater capable of heating each filament.

2. The fused filament deposition head as set forth in claim 1, further comprising a slot identifier carried adjacent the dispensing end, the slot identifier locating slots of a workpiece for the delivery of each filament.

3. The fused filament deposition head as set forth in claim 1, further comprising a finisher coming into abutment with the delivered filaments.

4. The fused filament deposition head as set forth in claim 3, wherein the finisher is a consolidation shoe or a consolidation roller.

* * * * *